US005950429A

United States Patent [19]

Hamkins

[11] Patent Number: 5,950,429

[45] Date of Patent: Sep. 14, 1999

[54] HYDRAULIC CONTROL VALVE SYSTEM WITH LOAD SENSING PRIORITY

[75] Inventor: Eric P. Hamkins, Waukesha, Wis.

[73] Assignee: Husco International, Inc., Waukesha, Wis.

[21] Appl. No.: 08/992,591

[22] Filed: Dec. 17, 1997

[51] Int. Cl.[6] .................... F16D 31/02

[52] U.S. Cl. .................... 60/422; 60/426; 91/446

[58] Field of Search .................... 60/422, 426, 427; 91/446, 447

[56] References Cited

U.S. PATENT DOCUMENTS

| | | | |
|---|---|---|---|
| 3,881,512 | 5/1975 | Wilke . | |
| 4,446,890 | 5/1984 | Simpson . | |
| 4,548,239 | 10/1985 | Eskildsen . | |
| 4,679,765 | 7/1987 | Kramer et al. . | |
| 4,693,272 | 9/1987 | Wilke . | |
| 4,736,770 | 4/1988 | Rouset et al. . | |
| 4,739,617 | 4/1988 | Kreth et al. | 60/426 |
| 5,025,625 | 6/1991 | Morikawa . | |
| 5,036,750 | 8/1991 | Katayama . | |
| 5,038,671 | 8/1991 | Ueno . | |
| 5,076,143 | 12/1991 | Ogawa . | |
| 5,113,894 | 5/1992 | Yoshida . | |
| 5,138,837 | 8/1992 | Obertrifter et al. | 91/446 X |
| 5,161,373 | 11/1992 | Morikawa . | |
| 5,222,426 | 6/1993 | Marcon et al. . | |
| 5,315,826 | 5/1994 | Hirata et al. . | |
| 5,347,811 | 9/1994 | Hasegawa et al. . | |
| 5,400,816 | 3/1995 | Gerstenberger . | |
| 5,579,642 | 12/1996 | Wilke et al. | 91/446 X |
| 5,579,676 | 12/1996 | Wilke . | |
| 5,699,665 | 12/1997 | Coolidge | 60/426 |

*Primary Examiner*—F. Daniel Lopez
*Attorney, Agent, or Firm*—Quarles & Brady LLP

[57] ABSTRACT

A hydraulic fluid is supplied from a tank to a plurality of actuators by a variable displacement pump which produces an output pressure that is a constant amount greater than a pressure at a control input. A mechanism senses the greatest pressure among the workports to provide a first load-dependent pressure and a second load-dependent pressure which is greater than the first load-dependent pressure when the pump operates a maximum flow capacity. Each valve section includes a pressure compensating valve which controls the fluid flow to the associated actuator in response to a pressure differential between the metering orifice and either the first or second load-dependent pressures. When the pump operates at maximum flow capacity, actuators connected to the valve sections in which the pressure compensating valve responds to the first load-dependent pressure receive the fluid flow on a priority basis as compared to the other valve sections. Thus the system operates the priority actuators as normally as possible during a maximum pump flow situation by reducing the fluid flow to non-priority actuators.

8 Claims, 3 Drawing Sheets

HYDRAULIC CONTROL VALVE SYSTEM WITH LOAD SENSING PRIORITY

FIELD OF THE INVENTION

The present invention relates to valve assemblies which control hydraulically powered machinery; and more particularly pressure compensated valves wherein a fixed differential pressure is to be maintained to achieve a uniform flow rate.

BACKGROUND OF THE INVENTION

The speed of a hydraulically driven working member on a machine depends upon the cross-sectional area of principal narrowed orifices of the hydraulic system and the pressure drop across those orifices. To facilitate control, pressure compensating hydraulic control systems have been designed to maintain an approximately constant pressure drop across those orifices. These previous control systems include sense lines which transmit the pressure at the valve workports to a control input of a variable displacement hydraulic pump which supplies pressurized hydraulic fluid in the system. Often the greatest of the workport pressures for several working members is selected to apply to the pump control input. The resulting self-adjustment of the pump output provides an approximately constant pressure drop across each control orifice whose cross-sectional area can be controlled by the machine operator. This facilitates control because, with the pressure drop held constant, the speed of movement of each working member is determined only by the cross-sectional area of the corresponding orifice. Hydraulic systems of this type are disclosed in U.S. Pat. Nos. 4,693,272 and 5,579,642, the disclosures in which are incorporated herein by reference.

With this type of system, all of the loads receive the same supply pressure. When the maximum flow capacity of the pump is reached, the supply of fluid to all actuators is diminished. However, when the maximum pump capacity is reached in some applications, it is desirable to maintain as great a flow as possible to certain actuators, even at the expense of a greater flow reduction to the other actuators. For example, in an industrial truck, the pump supplies a load lifting mechanism and hydraulic motors which drive the wheels. If the operator attempts to raise a heavy load while the truck is moving forward, the maximum pump flow capacity may be reached causing the forward movement to slow. In this situation, it is preferable to maintain the forward speed and raise the load at whatever rate can be achieved without affecting forward movement of the industrial truck.

SUMMARY OF THE INVENTION

A general object of the present invention is to provide a control valve assembly which allocates hydraulic fluid on a priority basis to designated workports when the pump output capacity has been reached.

These objects and others are satisfied by a valve assembly which has an array of valve sections for controlling flow of hydraulic fluid supplied from a tank to a plurality of actuators by a pump. The pump is of the type which produces an output pressure that is a constant amount greater than a pressure at a control input.

Each valve section has a workport to which one of the actuators connects and has a metering orifice through which the hydraulic fluid flows to the workport. The valve assembly incorporates a mechanism that senses the greatest pressure among all the workports of the valve assembly to provide a first load-dependent pressure. An isolator is incorporated in the valve assembly and responds to a differential between the pump output pressure and a sum of the first load-dependent pressure plus a predefined offset pressure by producing a second load-dependent pressure.

Every valve section also includes a pressure compensating valve with a variable orifice through which the fluid flows to the actuator associated with that valve section. The pressure compensating valve has a first input communicating with the metering orifice and has a second input. The pressure compensating valve responds to pressure at the first input being greater than pressure at the second chamber by enlarging the variable orifice, and responds to pressure at the second chamber being greater than pressure at the first input by reducing the variable orifice.

Certain actuators are considered priority devices while others are considered to be non-priority devices, in that it is desirable to attempt to maintain unlimited operation of the priority actuators under all conditions, even if doing so requires reducing fluid flow to the non-priority actuators. To this end, the second chamber of the pressure compensating valve, in each valve section associated with a priority actuator, receives the first load-dependent pressure, and the second chamber of the pressure compensating valve in each valve section associated with a non-priority actuator is connected to the outlet of the isolator thereby receiving the second load-dependent pressure.

The system is configured so that when the pump is operating at a maximum flow capacity, the first load-dependent pressure will be less than the second load-dependent pressure. As a consequence, a greater pressure drop will appear across the metering orifice in the valve sections associated with priority actuators than appears across the valve sections associated with non-priority actuators. Thus more fluid will flow to the priority actuators when the pump operates at maximum flow capacity.

DETAILED DESCRIPTION OF THE PRESENT INVENTION

Figure 1:
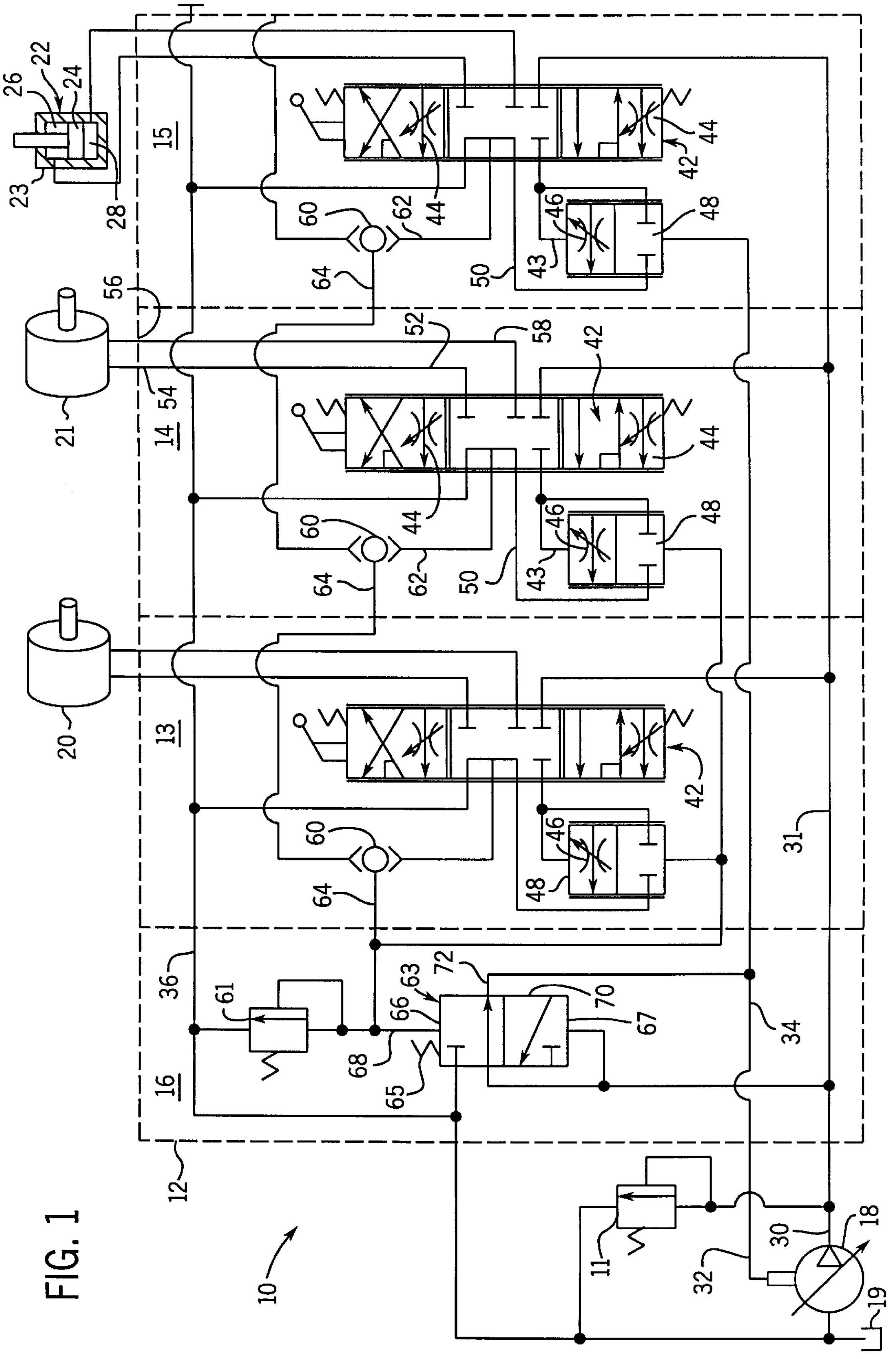
FIG. 1 a schematic diagram of a hydraulic system with a multiple valve assembly which incorporates the present invention.

With initial reference to FIG. 1 a hydraulic system 10 includes a multiple valve assembly 12 which controls motion of hydraulically powered working members of a machine, such as wheel motors and lift mechanism of an industrial truck. The physical structure of the valve assembly 12, comprises several individual valve sections 13, 14 and 15 interconnected side-by-side with an end section 16. A given valve section 13, 14 or 15 controls the flow of hydraulic fluid from a pump 18 to one of several actuators 20, 21 and 22 and the return flow of the fluid to a reservoir or tank 19. In the exemplary system 10, actuators 20 and 21 are hydraulic motors which drive the wheels of an industrial truck and actuator 22 is a cylinder 23 and piston 24 that raise and lower a load carried by the truck. The output of pump 18 is protected by a pressure relief valve 11.

The pump 18 typically is located remotely from the valve assembly 12 with the pump outlet connected by a supply conduit or hose 30 to a supply passage 31 which extends through the valve assembly 12. The pump 18 is a variable displacement type whose output pressure is designed to be the sum of the pressure at a displacement control port 32 plus a constant pressure, known as the "margin." The control port 32 is connected to a load sense passage 34 that extends through the sections 13–15 of the valve assembly 12. A reservoir passage 36 also extends through the valve assembly 12 and is coupled to the tank 19. End section 16 of the valve assembly 12 contains ports for connecting the supply passage 31 to the pump 18 and the reservoir passage 36 to the tank 19.

To facilitate understanding of the invention claimed herein, it is useful to describe basic fluid flow paths with respect to one of the valve sections 15 in the illustrated embodiment. Each of the valve sections 13–15 in the assembly 12 operates similarly, and the following description is applicable all of them.

Figure 2:
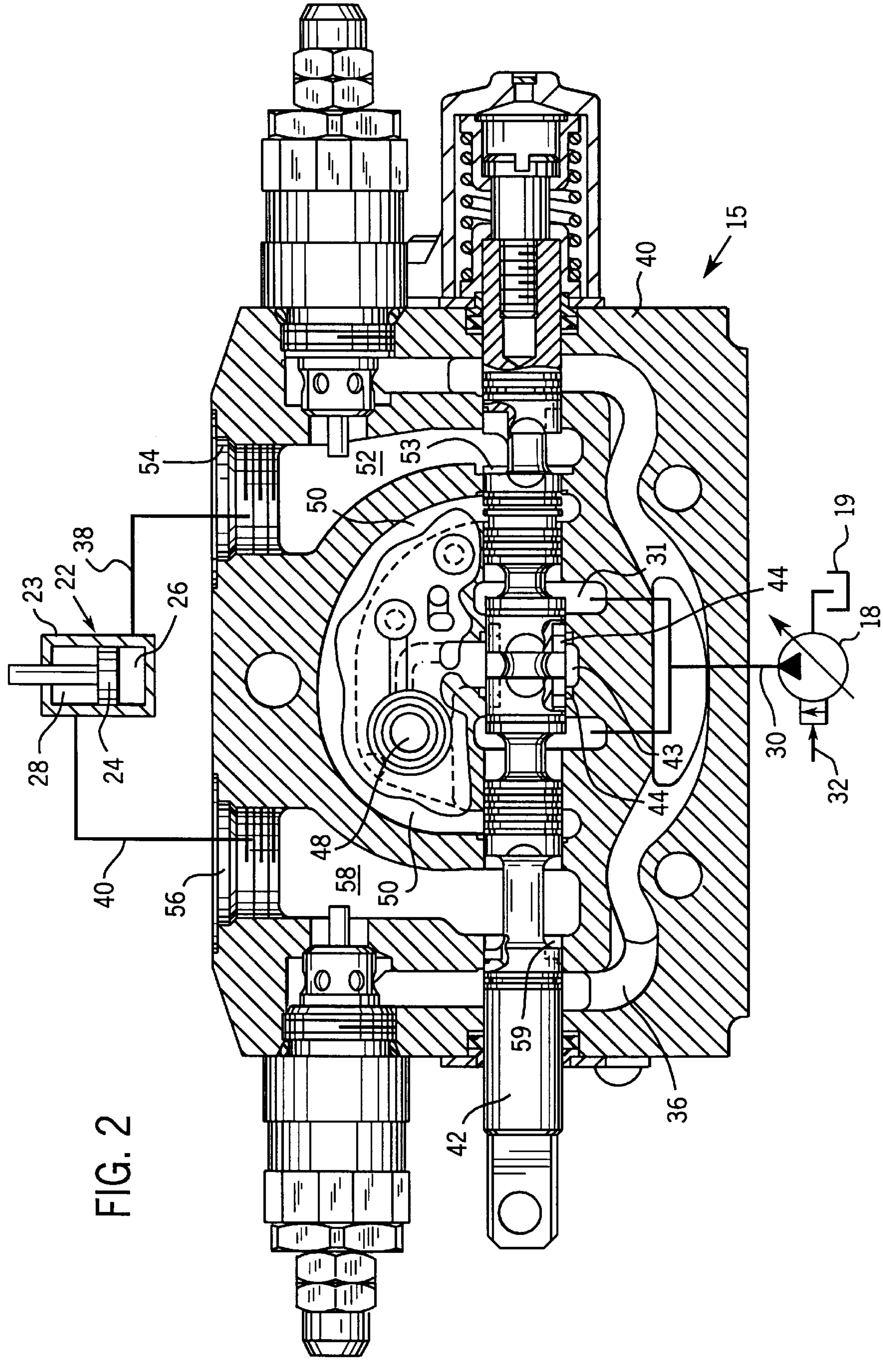
FIG. 2 is a cross-sectional view through one section of the multiple valve assembly which is shown schematically connected to a pump, a tank and a load cylinder.

With additional reference to FIG. 2, each valve section, such as section 15, has a body 40 and control spool 42 which a machine operator can move in either reciprocal direction within a bore in the body by operating a control member that may be attached thereto, but which is not shown. Depending on which way the spool 42 is moved, hydraulic fluid is directed to the bottom chamber 26 or the top chamber 28 of a cylinder housing 23, thereby driving the piston 24 up or down, respectively. The extent to which the machine operator moves the control spool 42 determines the speed of a working member connected to the associated actuator 22.

Reference herein to directional relationships, and movement, such as top and bottom or up and down, refer to the relationship and movement of the components in the orientation illustrated in the drawings, which may not be the orientation of the components in a particular application.

To raise the piston 24, the machine operator moves the control spool 42 leftward in the orientation illustrated in FIG. 2. This opens passages which allow the pump 18 (under the control of the load sensing network to be described later) to draw hydraulic fluid from the tank 19 and force the fluid through pump output conduit 30, into a supply passage 31 in the body 40. From the supply passage 31 the hydraulic fluid passes through a metering orifice formed by notch 44 of the control spool 42, through feeder passage 43 and through a variable orifice 46 formed by a pressure compensating check valve 48. In the open state of pressure compensating check valve 48, the hydraulic fluid travels through a bridge passage 50, a passage 53 of the control spool 42 and then through workport passage 52, out of workport 54 and into the lower chamber 26 of the cylinder housing 23. The pressure thus transmitted to the bottom of the piston 24 causes it to move upward, which forces hydraulic fluid out of the top chamber 28 of the cylinder housing 23. This exiting hydraulic fluid flows into another workport 56, through the workport passage 58, the control spool 42 via passage 59 and the reservoir passage 36 that is coupled to the fluid tank 19.

To move the piston 24 downward, the machine operator moves control spool 42 to the right, which opens a corresponding set of passages so that the pump 18 forces hydraulic fluid into the top chamber 28, and push fluid out of the bottom chamber 26 of cylinder housing 23, causing piston 24 to move downward.

Referring again to FIG. 1, the present invention relates to a pressure compensation mechanism of the multiple valve assembly 12, which senses the pressure at the powered workports in every valve section 13–15 and selects the greatest of those workport pressures. The selected pressure is used to derive a load-dependent pressure that is applied to the displacement control port 32 of the hydraulic pump 18. This selection is performed by a chain of shuttle valves 60, each of which is in a different valve section 13 and 14. The inputs to shuttle valve 60 in each of these sections 13 and 14 are (a) the bridge passage 50 via shuttle input passage 62 and (b) the shuttle coupling passage 64 from the upstream valve section 14 and 15, respectively. The bridge passage 50 sees the pressure at whichever workport 54 or 56 is powered in that particular valve section, or the pressure of reservoir passage 36 when the control spool 42 is in neutral. Each shuttle valve 60 operates to transmit the greater of the pressures at inputs (a) and (b) via its valve section's coupling passage 64 to the shuttle valve of the adjacent downstream valve section. Thus the pressure at that coupling passage 64 of the farthest downstream section 13 in the shuttle chain is the greatest of the workport pressures and is designated herein as a first load-dependent pressure.

It should be noted that the farthest upstream valve section 15 in the chain need not have a shuttle valve 60 as only its load pressure will be sent to the next valve section 14 via coupling passage 64. However, all valve sections 13–15 are identical for economy of manufacture. End section 16 includes a pressure relief valve 61 that prevents an excessive pressure from occurring in the coupling passage 64 of the final downstream valve section 13 to tank 19.

The shuttle coupling passage 64 of the farthest downstream valve section 13 in the chain of shuttle valves 60 communicates with the input 68 of an isolator 63 and thus applies the first load-dependent pressure to that input. Isolator 63 includes a valve member 70 which reciprocally slides in a bore into which the input 68 opens on one side of the valve member, so that the greatest of all the powered workport pressures in the valve assembly 12 urges the valve member 70 in a first direction in the bore. A spring 65 exerts a spring pressure which also urges the valve member 70 in a first direction. The pump output pressure is applied to the other side 67 of the isolator and urges the valve member 70 in an opposing second direction. If the pump output pressure is less than the sum of the greatest powered workport pressure plus the spring pressure, the isolator valve member 70 is urged in the first direction to establish a connection between the load sense passage 34 via isolator outlet 72 and the pump output supply passage 31. On the other hand, when the pump output pressure is greater than the sum of the greatest powered workport pressure plus the spring pressure, the isolator valve member 70 moves in the second direction and establishes the connection between the load sense passage 34 and tank 19. This operation of the isolator valve member 70 applies either the pump output pressure or the pressure in tank 19, which may be assumed to be zero, to the isolator outlet 72, depending upon the pressure differential between the two sides of the valve member 70. As a result, the isolator valve member 70 tends at any time to an equilibrium position at which a second load-dependent pressure produced at the isolator outlet 72 is a function of the first load-dependent pressure. The first and the second load-dependent pressures are not equal as a result of the significant pressure exerted by the spring 65. Under normal operating conditions, the action of isolator 63 raises and lowers the pump output pressure to equal the greatest powered workport pressure plus the pressure of spring 65.

Figure 3:
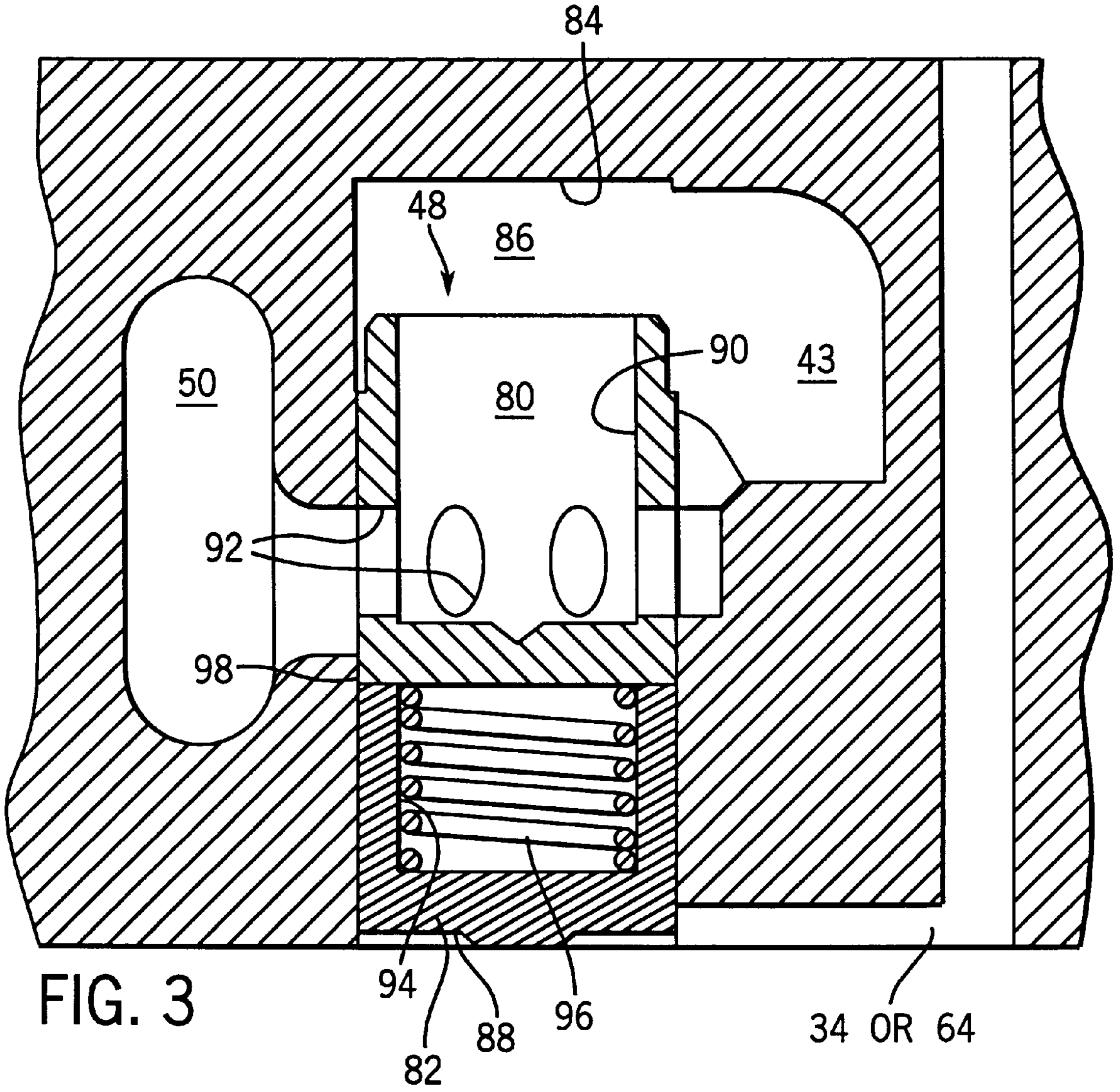
FIG. 3 is an enlarged cross-sectional view of a portion of a valve section showing details of a pressure compensating check valve.

As noted previously the hydraulic fluid flowing in each valve section 13–15, between the pump output and the powered workport, passes through a pressure compensating check valve 48. With reference to FIG. 3, this check valve 48 includes a spool 80 and a piston 82 which form a valve element that divides valve bore 84 into first chamber 86 in communication with feeder passage 43 and second chamber 88.

Spool 80 is cup-shaped with an open end communicating with the feeder passage 43 and having a groove in its lip so that fluid from that passage can flow into the interior of the spool even when abutting the end of the bore 84. The spool 80 has a central cavity 90 with lateral apertures 92 in a side wall which together form a path through the compensator 48 between the feeder passage 43 and the bridge passage 50 when the valve is in the illustrated state. The variable orifice 46 is formed by the relative position between the lateral apertures 92 of the spool 80 and an opening the body 40 to bridge passage 50. When the spool 80 abuts the upper end of the bore 84 the variable orifice 46 is closed entirely. Thus movement of the spool 80 alters the size of the variable orifice.

The piston 83 also has a cup-shape with the open end facing the closed end of the spool 80 and defining an intermediate cavity 94 between the closed end of the spool and piston. The exterior corner 98 of the closed end of the spool 80 is beveled that the intermediate cavity 94 is always in communication with the bridge passage 50 even when the piston 82 abuts the spool 80 as shown in FIG. 3. A spring 96, located in the intermediate cavity 94, exerts a relatively weak force which separates the spool 80 and piston 82 when the system is not pressurized.

The second chamber 88 of the pressure compensating check valve 48 is connected to either the load sense passage 34 or the input 68 of isolator 63 depending on the configuration of the particular valve section 13–15 as shown in FIG. 1. Specifically certain valve sections 13 and 14 are designated as controlling priority actuators, whereas valve section 15 controls a non-priority actuator. When the fluid demand exceeds the maximum flow capacity of the pump, a priority actuator is to receive as much of the available hydraulic fluid flow as possible to maintain actuator operation even at the expense of a greater reduction in flow to the non-priority actuators. A non-priority function is one which may receive reduced fluid flow in an attempt to maintain normal operation of a priority actuator. For example, driving the wheels of an industrial truck by motors 20 and 21 may be designated as a priority function, so that if the operator raises a heavy load while the truck is moving forward, the forward movement will not be adversely impacted. Thus, the load may rise at a slower than normal rate in order to maintain the forward speed of the truck.

This priority allocation of pump capacity is accomplished by connecting the second chamber 88 of pressure compensating check valve 48 in the valve sections 13 and 14 for the priority actuators to the input 68 of isolator 63. In the valve section 15 for a non-priority actuator 22, the second chamber 88 of the pressure compensating check valve 48 communicates with the load sense passage 34.

As a result of these connections, the second chamber 88 of the pressure compensating check valve 48 in a priority valve section 13 or 14 receives the first load-dependent pressure, i.e. the greatest of all the powered workport pressures. These connections also apply the pressure in the load sense passage to the second chamber 88 of the pressure compensating check valve 48 in the non-priority valve section 15. When the maximum flow capacity of the pump has not been reached, both the priority and the non-priority valve sections 13–15 receive the full amount of fluid in order to operate their respective actuator 20–22 to the desired level.

However, when the pump 19 is operating at the maximum flow capacity, the pressure drop across the metering orifice 44 in the valve sections 13–15 is different depending upon whether the valve section is for a priority or a non-priority actuator. In this situation the priority valve sections 13 and 14 continue to operate with the normal pressure drop (the pressure of isolator spring 65) across their metering orifices 44, while valve section 15 for a non-priority actuator 22 has the artificially high, load sense pressure applied to the second chamber of its pressure compensating valve 48. The lower pressure applied to the second chamber 88 of the pressure compensating check valve 48 in the priority valve sections 13 and 14 causes a greater amount of hydraulic fluid to flow to the associated actuators 20 and 21 than flows to through the non-priority valve section 15 to actuator 22. As a consequence, when the pump 19 is operating at the maximum flow capacity, operation of non-priority actuators will be sacrificed, or reduced, in an attempt to maintain normal operation of the priority actuators.

The foregoing description is directed primarily to a preferred embodiment of the invention. Although some attention was given to various alternatives within the scope of the invention, it is anticipated that skilled artisans will likely realize additional alternatives that are now apparent from the disclosure of those embodiments. For example, the valve assembly 10 may have different numbers of priority and non-priority valve section than those illustrated in FIG. 1. Accordingly, the scope of the invention should be determined from the following claims and not limited by the above disclosure.

I claim:

1. In an array of valve sections for controlling flow of hydraulic fluid supplied from a tank to a plurality of actuators by a pump which produces a pump output pressure that is a constant amount greater than a pressure at a control input, wherein each valve section has a metering orifice through which the hydraulic fluid flows to a workport to which one actuator connects, the array of valve sections being of a type in which a greatest pressure among the workports is sensed to provide a first load-dependent pressure; the improvement comprising:

an isolator which responds to a differential between the pump output pressure and a sum of the first load-dependent pressure and a predefined offset pressure by producing a second load-dependent pressure at an outlet; and each valve section including a pressure compensating valve with a variable orifice through which fluid flows to the one actuator, the pressure compensating valve having a first input communicating with the metering orifice and having a second input, wherein the pressure compensating valve responds to pressure at the first input being greater than pressure at the second input by enlarging the variable orifice, and responds to pressure at the second input being greater than pressure at the first input by reducing the variable orifice;

wherein the second input of the pressure compensating valve in at least one valve section is connected to the outlet of the isolator to receive the second load-dependent pressure, and the second input of the pressure compensating valve in at least one other valve section receives the first load-dependent pressure, thereby establishing different pressure drops across the metering orifices in the different valve sections.

2. The hydraulic system as recited in claim 1 wherein the isolator comprises a valve member which is biased in a first direction by a spring which provides the predefined offset pressure, the isolator receiving the greatest pressure among the workports which urges the valve member in a first direction which establishes communication between the pump output pressure and the outlet, and receiving the pump output pressure which urges the valve member in a second direction which establishes a connection between the tank and the outlet.

3. The hydraulic system as recited in claim 1 wherein the isolator further comprises a valve member and a spring that engages the valve member to provide the predefined offset pressure.

4. The hydraulic system as recited in claim 1 wherein the second load-dependent pressure produced by the isolator is greater than the first load-dependent pressure.

5. In hydraulic system which includes a tank from which a pump supplies hydraulic fluid through a plurality of valve sections having workports connected to a plurality of actuators, wherein each valve section has a metering orifice through which the hydraulic fluid flows to one of the plurality of actuators, and the plurality of valve sections being of the type in which the greatest pressure among the workports which is applied to a conduit; the improvement comprising:

an isolator having an outlet and a valve member which is biased in a first direction by a spring, the isolator receiving the greatest pressure among the workports which urges the valve member in a first direction which establishes a connection between the pump output pressure and the outlet, and receiving the pump output pressure which urges the valve member in a second direction which establishes a connection between the tank and the outlet; and each valve section having a pressure compensating valve with a valve element slidably located in a bore thereby defining first chamber at one end of the bore and a second chamber at an opposite end of the bore, the first chamber being in communication with the metering orifice, the bore having an opening coupled to one of the workports, wherein position of the valve element with respect to the opening defining a variable orifice through which fluid is supplied from the first chamber to the one workport, wherein a greater pressure in the first chamber than in the second chamber enlarges the variable orifice, and a greater pressure in the second chamber than in the first chamber reduces the variable orifice;

a first passageway connecting the second chamber of the pressure compensating valve in at least one valve section to the outlet of the isolator; and a second passageway connecting the second chamber of the pressure compensating valve in at least one other valve section to the conduit, thereby establishing different pressure drops across the metering orifices in different valve sections.

6. The hydraulic system as recited in claim 5 further comprising a chain of shuttle valves for selecting the greatest pressure among the workports of the hydraulic system and an output of the chain of shuttle valves being coupled to the conduit.

7. The hydraulic system as recited in claim 6 wherein each valve section further comprises one of the chain of shuttle valves having an output, a first input of a respective one of the shuttle valves selectively connected to a corresponding one of the first chambers, and a second input of a respective one of the shuttle valves connected an output of a shuttle valve in a different valve section of the hydraulic system.

8. The hydraulic system as recited in claim 5 wherein the greatest pressure among the workports is less than pressure at the output of the isolator.

* * * * *